(12) United States Patent
Fujinawa et al.

(10) Patent No.: US 7,164,508 B2
(45) Date of Patent: Jan. 16, 2007

(54) IMAGE READING APPARATUS

(75) Inventors: Nobuhiro Fujinawa, Yokohama (JP); Takuya Shirahata, Yokohama (JP)

(73) Assignee: Nikon Corporation, Tokyo (JP)

( * ) Notice: Subject to any disclaimer, the term of this patent is extended or adjusted under 35 U.S.C. 154(b) by 504 days.

(21) Appl. No.: 10/404,537

(22) Filed: Apr. 2, 2003

(65) Prior Publication Data

US 2004/0012827 A1 Jan. 22, 2004

Related U.S. Application Data

(63) Continuation of application No. 09/801,711, filed on Mar. 9, 2001, now abandoned, which is a continuation of application No. 08/907,641, filed on Aug. 8, 1997, now abandoned.

(51) Int. Cl.
H04N 1/04 (2006.01)

(52) U.S. Cl. .................. 358/474; 358/449; 358/487; 358/498

(58) Field of Classification Search ............ 358/474, 358/1.2, 449, 451, 482, 486, 487, 498
See application file for complete search history.

(56) References Cited

U.S. PATENT DOCUMENTS

| | | | | |
|---|---|---|---|---|
| 4,506,969 A | | 3/1985 | Baker | 396/568 |
| 4,554,560 A | | 11/1985 | Kanaoka | 347/259 |
| 4,746,953 A | * | 5/1988 | Knodt | 399/185 |
| 5,221,976 A | | 6/1993 | Dash et al. | 358/486 |
| 5,402,252 A | * | 3/1995 | Kojima | 358/486 |
| 5,768,444 A | | 6/1998 | Nishimura | 382/298 |
| 5,862,297 A | | 1/1999 | Timmermans | 386/70 |
| 5,920,320 A | | 7/1999 | Shimizu | 345/422 |
| 5,934,167 A | | 8/1999 | Yamamoto | 83/650 |
| 5,995,201 A | | 11/1999 | Sakaguchi | 355/55 |
| 6,057,937 A | | 5/2000 | Shimizu et al. | 358/302 |
| 6,081,687 A | * | 6/2000 | Munemori et al. | 399/374 |
| 6,172,356 B1 | * | 1/2001 | Ogura et al. | 250/227.11 |
| 6,342,957 B1 | * | 1/2002 | Itoh | 358/527 |
| 6,603,885 B1 | * | 8/2003 | Enomoto | 382/263 |
| 2002/0196472 A1 | * | 12/2002 | Enomoto | 358/3.26 |
| 2003/0031375 A1 | * | 2/2003 | Enomoto | 382/255 |

FOREIGN PATENT DOCUMENTS

| | | | |
|---|---|---|---|
| JP | 62296661 | * | 12/1987 |
| JP | A-5-75922 | | 3/1993 |
| JP | A-8-65467 | | 3/1993 |
| JP | 08149232 | * | 6/1996 |
| JP | 10112785 | * | 4/1998 |
| JP | 2002084386 | * | 3/2002 |
| JP | 2003040482 | * | 2/2003 |

* cited by examiner

*Primary Examiner*—Jerome Grant, II
(74) *Attorney, Agent, or Firm*—Oliff & Berridge, PLC

(57) ABSTRACT

An image reading apparatus having an illuminating device for illuminating a film original, an image reading device for reading an image on the film original illuminated by the illuminating device and outputting image signals. The image reading apparatus further includes a type discriminating device for discriminating whether the film original is a first film original or a second film original having different film sizes, and a reading scope modifying device for modifying the reading scope of the image reading means according to the result of discrimination of the type discriminating means.

34 Claims, 14 Drawing Sheets

FIG. 14(c)

IMAGE READING APPARATUS

This is a Continuation of application Ser. No. 09/801,711 filed Mar. 9, 2001 now abandoned, which in turn is a Continuation of application Ser. No. 08/907,641 filed Aug. 8, 1997 (now abandoned). The entire disclosure of the prior application(s) is hereby incorporated by reference herein in its entirety.

INCORPORATION BY REFERENCE

The disclosures of the following priority applications are herein incorporated by reference: Japanese Patent Application No. 8-211525, filed Aug. 9, 1996; and Japanese Patent Application No. 9-083009, filed Apr. 1, 1997.

BACKGROUND OF THE INVENTION

1. Field of the Invention

The invention relates to an image reading apparatus for reading film images. In particular, the invention relates to an image reading apparatus that can handle films having different sizes.

2. Description of Related Art

A film scanner is an image reading apparatus for reading film images provided on film photographed by a camera, for example. The film scanner reads images provided on negative film or on reversal film under the control of a host computer and outputs those images to the host computer. The host computer displays the film images on a monitor screen.

With 35 mm film, a user receives developed film in strip or mounted form (e.g., slides). In the latter case, a film scanner is used for the purpose of reading the images provided on the film received on slide mounts. In the case of strip film, the film scanner reads those images by receiving the film in a custom holder.

Recently, new standards have been proposed whereby long-type film ("roll film") is handled while it is housed in a cartridge. With this film system, the film is in a photography-enabled state simply by loading the cartridge into the camera. Additionally, when the film is developed, the user receives a cartridge housing the developed film (rather than receiving the developed film without a cartridge).

A conventional film scanner cannot read the images of the roll film housed in the cartridge. Consequently, new types of film scanners have been proposed (see, for example, Japanese Laid-Open Patent Application No. 5-75922), whereby the images on roll film housed in a cartridge can be read.

One type of film scanner uses a line sensor having a plurality of photoelectric converters arranged in a row. A second type of film scanner uses an area sensor having a plurality of photoelectric converters arranged in rows and columns (i.e., a matrix). Japanese Laid-Open Patent Application No. 5-75922 uses an area sensor.

SUMMARY OF THE INVENTION

It is desirable to provide an image reading apparatus that can handle both 35 mm film and the new roll film. However, the 35 mm film is wider than the roll film. Accordingly, an image reading apparatus must be able to handle films having different film widths.

Since the 35 mm film is wider than the roll film, an optical system set up to handle 35 mm film would read portions of the roll film that did not contain data if used on roll film. Thus, one aspect of the present invention is to provide an apparatus that limits the data read based on a particular film size. The optical system must be able to read the scope of an image on 35 mm film and on roll film without the output of useless data.

If the 35 mm film and the roll film were read at the same resolution, the effective resolution of the roll film would be less because of the small width of the roll film. Thus, another aspect of the invention is to provide an apparatus that modifies the resolution of the optical system based on the film size in order to obtain an equal amount of data with 35 mm film and roll film.

Although modifying the resolution does not significantly affect scanning with the area sensor, some problems occur with line sensors. When reading with a line sensor, in order to maintain the vertical-horizontal (aspect) ratio of the pixels, it is necessary to modify the pitch of the auxiliary scan. Thus, another aspect of the invention is to address such problems, and to provide an image reading apparatus that can perform the appropriate reading according to the type of film.

According to one aspect of the invention, an image reading apparatus that includes an image reading device determines the type of original (e.g. film type) that is input to the apparatus and then modifies the reading scope of the image reading device based on the type of original. This can be accomplished, for example, by adjusting the optical system of the image reading device, or by processing the signal output by the image reading device. The determination of the type of original can be made, for example, by monitoring the status of sensors provided at the input locations of the different types of originals, or by analyzing the signal output by the image reading device as the original is being scanned.

The apparatus may also modify the reading resolution of the image reading device according to the type of original that is determined. This can be done, for example, by adjusting the auxiliary scan amount if a line sensor is used as the image reading device.

For example, when the original is film, the type of film can be determined based on the presence or absence of the detection of a perforation in the film. Alternatively, the type of film can be determined based on a detection of the specification of the type of film. The type of film also can be determined based on the presence or absence of detection by a loading detection sensor for the film original.

According to another aspect of the invention, the resolution of the image reading device is modified based on the type of original that is loaded in the apparatus. Thus, regardless of whether the first type of original or the second type of original is loaded, the light-receiving area of the image reading device can be employed effectively, and high-quality images can be obtained.

Further objects, details and advantages of the invention will be apparent from the following detailed description, when read in conjunction with the drawings.

BRIEF DESCRIPTION OF THE DRAWINGS

FIGS. 14(a)–14(d) are explanatory drawings for reading roll film.

DETAILED DESCRIPTION OF PREFERRED EMBODIMENTS

Figure 1:
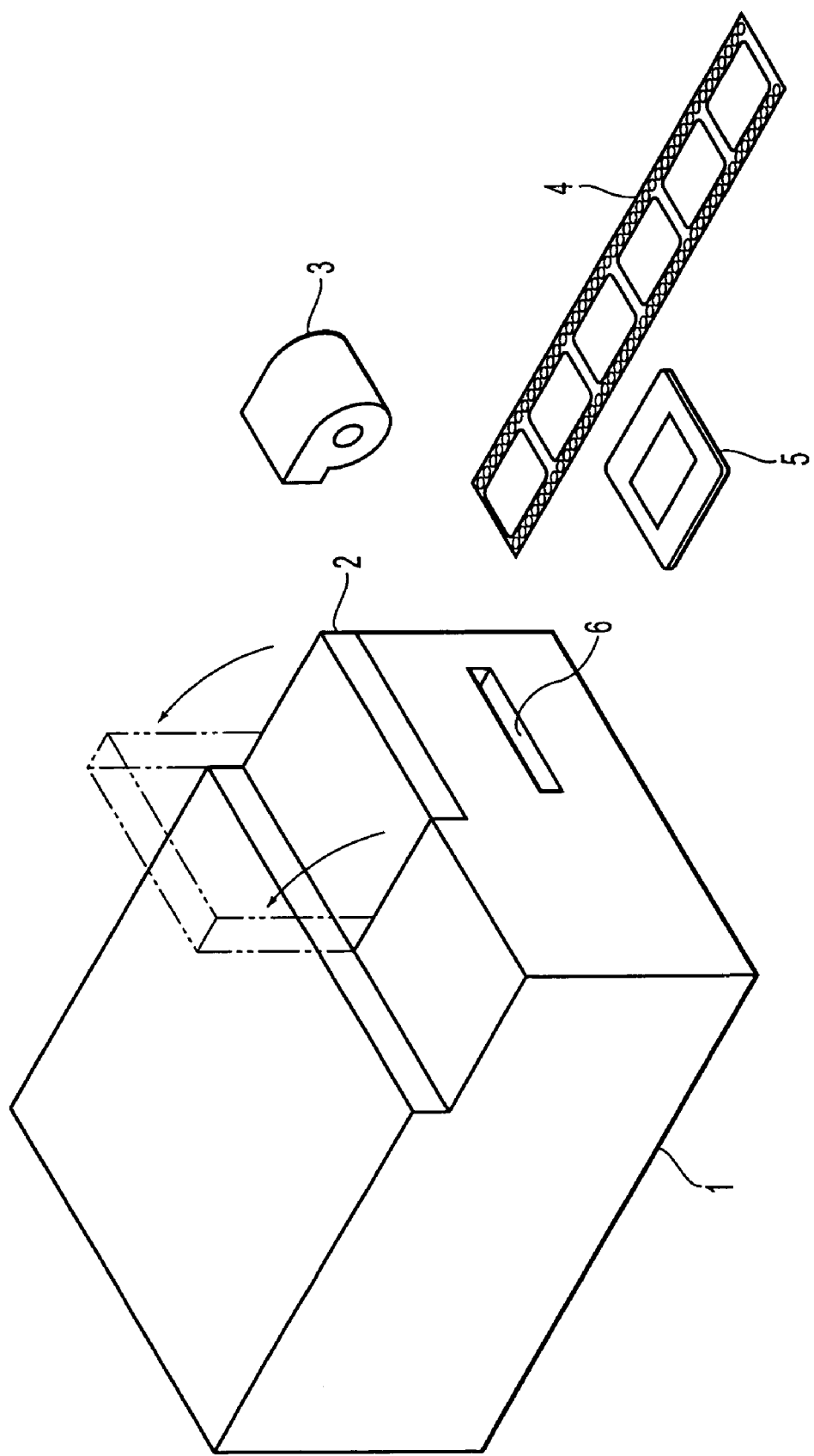
FIG. 1 is an external perspective view of an image reading apparatus of one embodiment of the present invention.

FIG. 1 shows an image reading apparatus 1 including a cover 2 on an upper surface thereof. The cover 2 is for opening and closing a cartridge chamber for loading a cartridge 3. The cartridge 3 houses roll film. An insertion opening 6 is located on the side surface of the image reading apparatus. The insertion opening 6 is used for inserting the strip film 4 and slide-mounted film 5. The strip film 4 and slide-mounted film 5 are well-known 35 mm films, for example.

Figure 2:
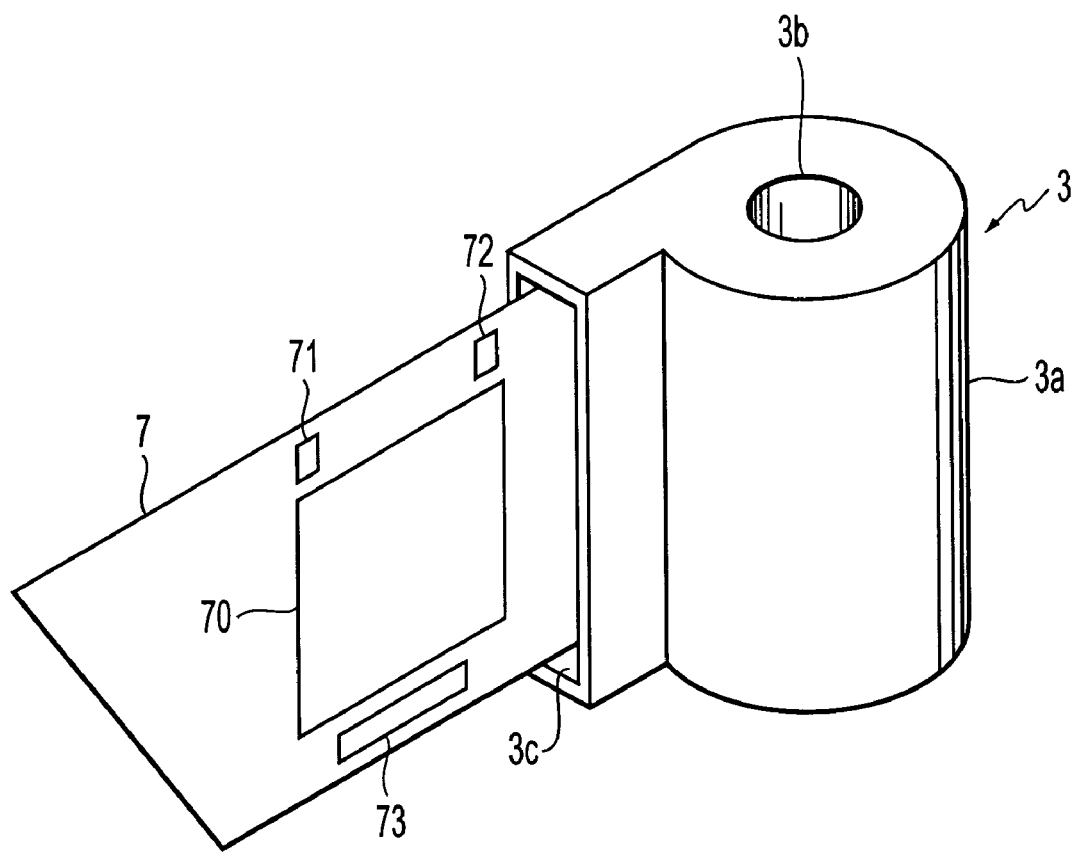
FIG. 2 is an external perspective view of a cartridge of roll film.
Figure 3:
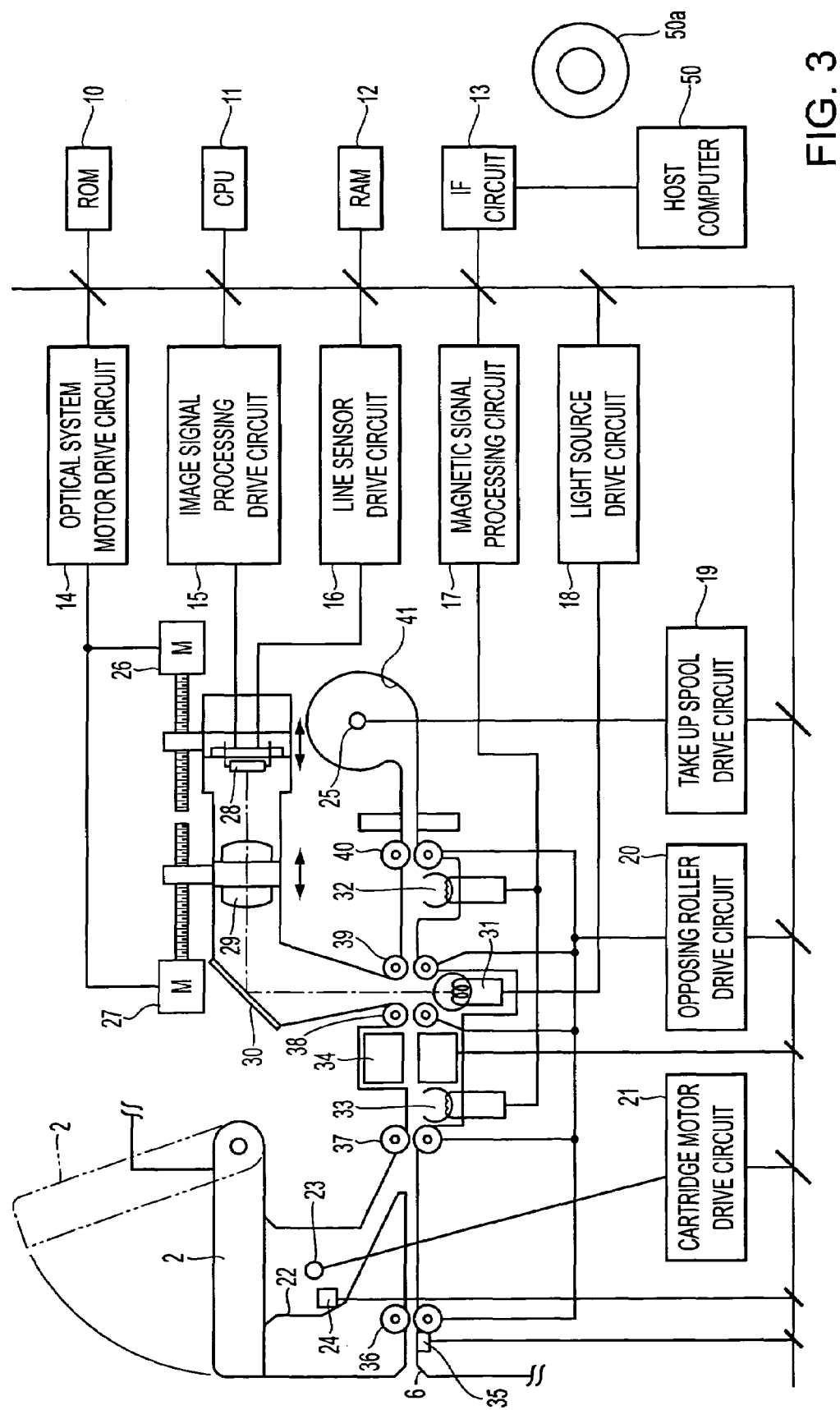
FIG. 3 is a schematic block diagram configuration of the FIG. 1 image reading apparatus.
Figure 4:
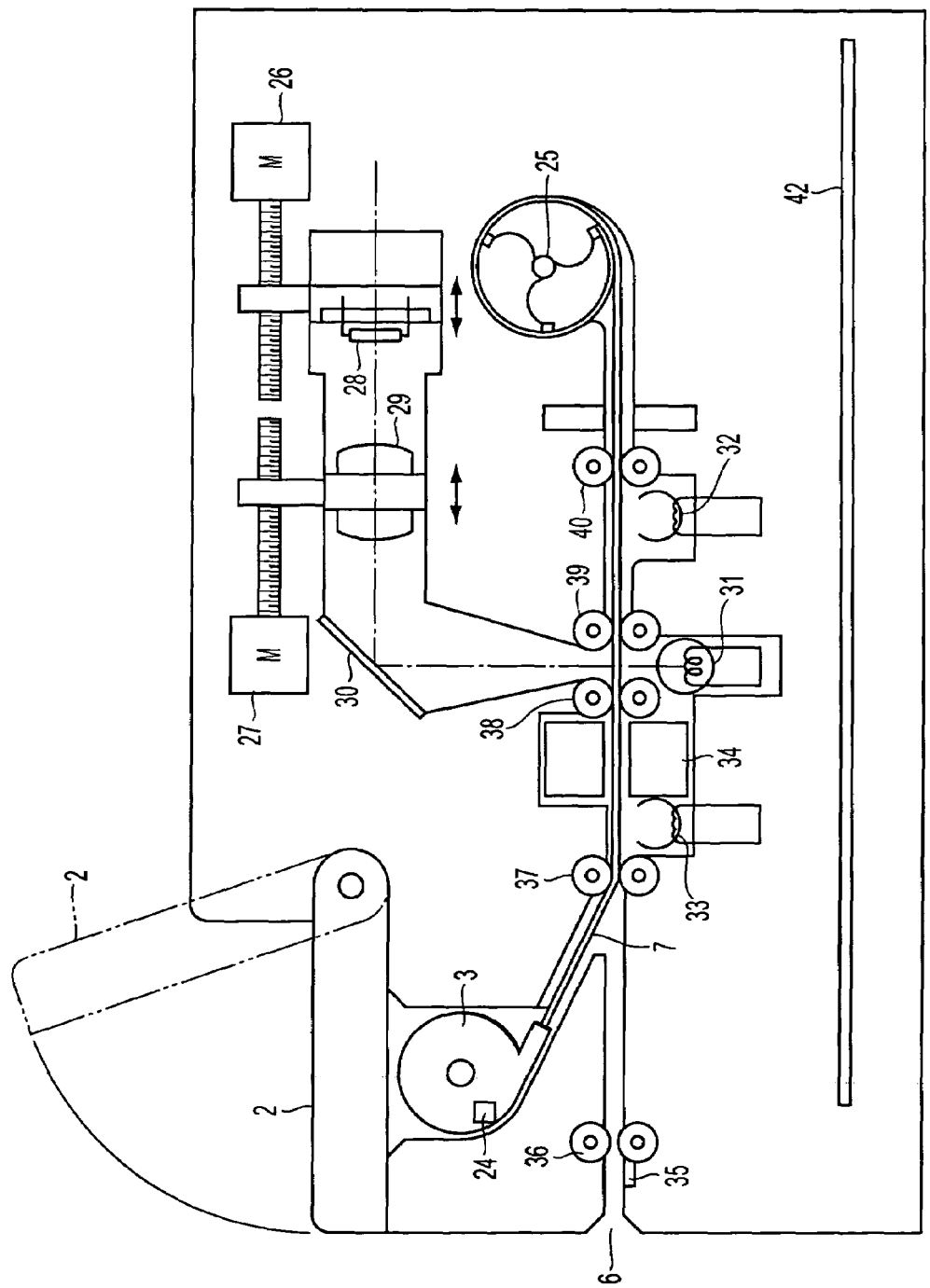
FIG. 4 shows the FIG. 1 apparatus during the reading of roll film.
Figure 5:
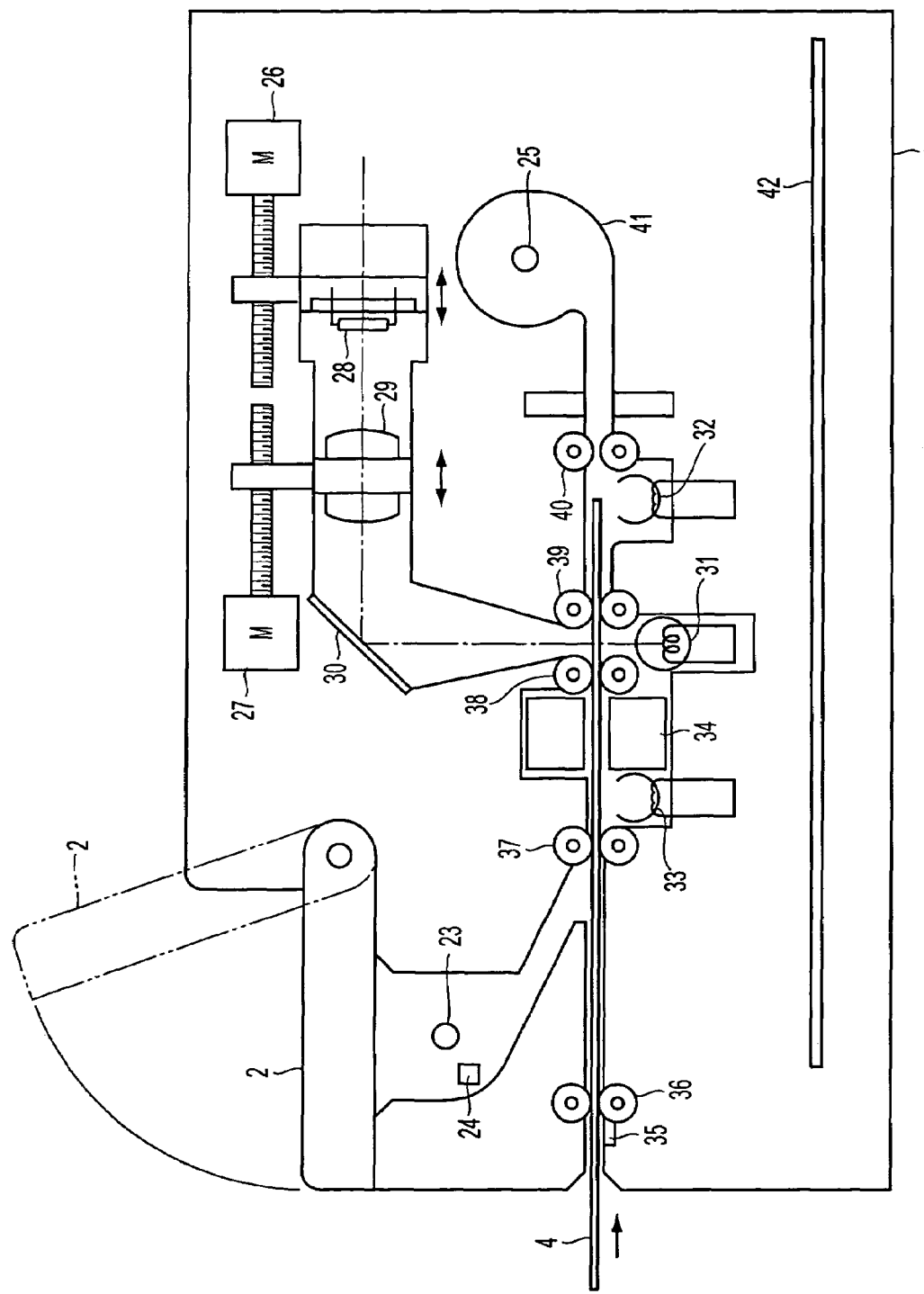
FIG. 5 shows the FIG. 1 apparatus during the reading of a strip of 35 mm film.
Figure 6:
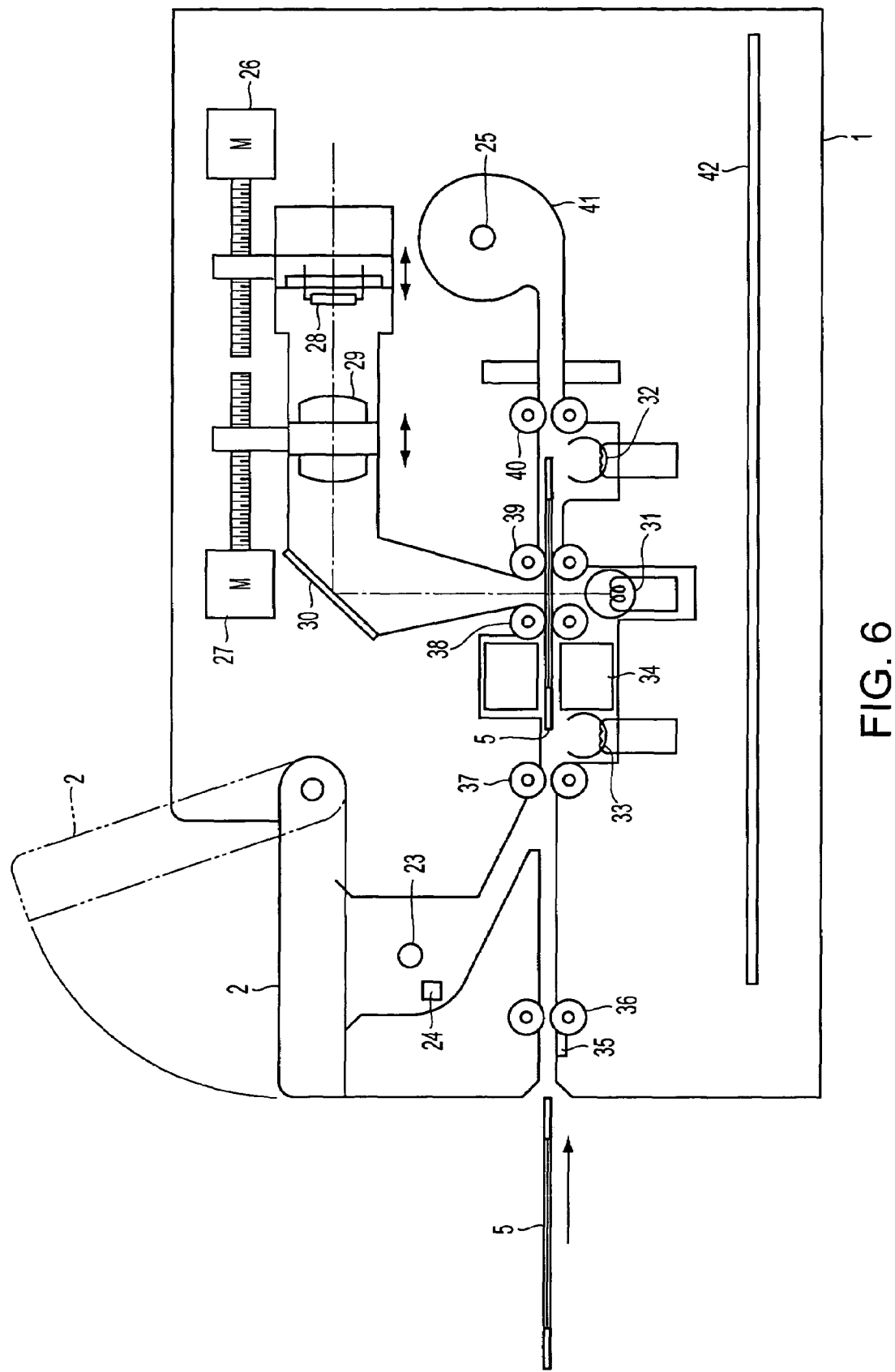
FIG. 6 shows the FIG. 1 apparatus during the reading of slide-mounted 35 mm film.

FIG. 2 shows an external view of the cartridge 3. The cartridge 3 includes a cylindrical case 3a. The cartridge 3 has two ends which axially support a cartridge spool 3b that extends in the longitudinal direction of the cylindrical case 3a. This configuration allows the cartridge spool 3b to rotate freely.

On a side surface of the cartridge 3 (not shown) a disk is arranged. The disk is for displaying information indicating whether or not the housed roll film is developed. The disk further provides optically readable information indicating the type of film. Other information includes whether the film is negative film, positive film, color film, monochrome film, the manufacturer name and model number of the film.

The roll film 7 is fixed at its base end to the cartridge spool 3b. The roll film 7 is wound up into the case 3a, and is housed entirely inside the case 3a. The leading end enters into and emerges from the case 3a through an opening 3c according to forward and backward rotational driving of the cartridge spool 3b.

The roll film 7 has an image memory area 70, two perforations 71 and 72 on a side (in a lateral direction), and a magnetic memory area 73 on the other side (in a lateral direction) for each frame. The two perforations 71 and 72 are provided in fixed positions for specifying the start position and end position of the image memory area 70.

Information is recorded in each magnetic memory area 73. The recorded information relates to frame number, title, photographic date and time, photographic condition, specified print size, and other information.

As shown in FIGS. 3–6, the image reading apparatus comprises, an insertion opening 6, a ROM 10, a central processing unit (CPU) 11, a RAM 12, an interface circuit (IF circuit) 13, an optical system motor drive circuit 14, an image signal processing circuit 15, a line sensor drive circuit 16, a magnetic signal processing circuit 17, a light source drive circuit 18, a take-up spool drive circuit 19, an opposing roller drive circuit 20, a cartridge motor drive circuit 21, a loading chamber 22 for the cartridge 3, a cartridge motor 23, a film information reading sensor 24, a take-up spool motor 25, a reading device motor 26, a lens motor 27, a line sensor 28, a lens 29, a reflective mirror 30, a light source 31, magnetic sensors 32 and 33, an optical sensor 34, a film detection sensor 35, opposing rollers 36, 37, 38, 39 and 40 and a take-up chamber 41. Many of the electronic components are mounted on a circuit board 42 shown in FIGS. 4–6.

The image reading apparatus is connected to a host computer 50 via IF circuit 13. The host computer 50 comprises a central processing unit, a program memory (e.g., ROM), a working memory (e.g., RAM), a display device (which functions as an output device) and a keyboard and mouse (which function as input devices).

A cartridge motor 23 and a film information reading sensor 24 are provided in the loading chamber 22. When the user opens the cover 2 and loads the cartridge 3 into the cartridge chamber 22, the cartridge spool 3b engages the rotating shaft of cartridge motor 23. The film information on the disk (of the loaded cartridge 3) is read by the film information reading sensor 24. This information is also supplied to CPU 11.

The cartridge motor 23 is driven by cartridge motor drive circuit 21. The cartridge motor drive circuit 21 is controlled by CPU 11. The cartridge motor drive circuit 21 controls (via CPU 11) rotational speed, rotational direction and stopping.

When the cartridge motor 23 is driven forward, the roll film 7 is delivered out from the cartridge 3 to a conveyor path. When the cartridge motor 23 is driven backward, the roll film 7 is taken up inside cartridge 3 from the conveyor path (See FIG. 4).

The film detection sensor 35 and opposing rollers 36 are provided in insertion opening 6. When the user inserts the strip film 4 or the slide-mounted film 5 into the insertion opening 6, the film detection sensor 35 detects the strip film 4 or the slide-mounted film 5. The film detection sensor 35 provides the detection to CPU 11.

CPU 11 controls the opposing roller drive circuit 20, which receives the detection signal from film detection sensor 35. The opposing roller drive circuit 20 controls rotation of the opposing rollers 36. The opposing roller drive circuit 20 receives instructions from CPU 11. As a result, the strip film 4 and slide-mounted film 5 are provided to the conveyor path (see FIGS. 5–6).

Along the conveyor path are opposing rollers 37, a magnetic head 33, an optical sensor 34, opposing rollers 38, opposing rollers 39, a magnetic head 32, opposing rollers 40, and a take-up chamber 41. The light source 31 is provided between opposing rollers 38 and 39.

The opposing rollers 37, 38, 39 and 40 are driven separately by the opposing roller drive circuit 20. The opposing rollers 37 convey roll film 7, delivered from loading chamber 22, to the opposing rollers 38. The opposing rollers 37 convey 35 mm film, delivered from the insertion opening 6 by the opposing rollers 36, to the opposing rollers 38.

The opposing rollers 38 and 39 feed the film original at a constant speed during image reading. The opposing rollers 40 convey the film (roll film 7 and strip film 4), to take-up chamber 41. The opposing rollers 40 also convey the film back to opposing rollers 39.

As is known, if an area-type image sensor were provided instead of the line sensor 28, it would not be necessary to feed the film using rollers 38 and 39 during image reading of a frame.

The feeding speed of opposing rollers 40 is set a little higher than the feeding speed of opposing rollers 39, so that slack does not occur. This feeding speed relationship is maintained when the roll film 7 is conveyed to the take-up chamber 41.

A take-up spool motor 25 is provided in the take-up chamber 41. The take-up spool motor 25 rotates based on signals supplied by the take-up spool drive circuit 19. Roll film 7 is taken up on the take-up shaft of the take-up spool motor 25 (refer to FIG. 4). Strip film 4 may also be taken up on the take-up shaft of take-up spool motor 25.

The magnetic heads 32 and 33 read magnetic information stored in the magnetic memory area 73 of roll film 7. They also provide the information to CPU 11 under control of the magnetic signal processing circuit 17. The magnetic heads 32 and 33 also can perform writing of information to the magnetic memory area 73 under the control of magnetic signal processing circuit 17.

The magnetic signal processing circuit 17 digitizes the magnetic information read by the magnetic heads 32 and 33, and provides it to CPU 11. The magnetic signal processing circuit 17 also can provide the information, written to magnetic memory area 73, to the magnetic heads 32 and 33.

The optical sensor 34 optically detects each perforation 71 and 72 of the roll film 7. The optical sensor 34 provides that detection to CPU 11.

Light source 31 illuminates one surface of the film. The light source 31 is controlled by the light source drive circuit 18. The light transmitted through the film is introduced to the line sensor 28 via the lens 29.

The light source 31 comprises light-emitting diodes (LEDs) of three colors, R (red), G (green) and B (blue). In this case, the light source drive circuit 18 controls switching of lighting and extinguishing of the three colors of LEDs of the light source 31 following instructions from CPU 11.

Light source 31 may also be a white light source. In this case, three colors of filters R (red), G (green) and B (blue) are provided. When the three colors of filters are provided, a switching mechanism for the three colors of filters is required.

While the illustrated embodiment includes an architecture in which light is transmitted through the film, the invention also can be applied to architectures in which the light is reflected from the film.

Lens 29 is supported by a worm that couples the lens to the rotating shaft of lens motor 27 so that it can move in accordance with rotation of the rotating shaft. The line sensor 28 is supported by a worm that couples the line sensor to the rotating shaft of the take-up motor 26 so that the position of the light-receiving surface can be moved in accordance with the rotation of the rotating shaft.

CPU 11 separately drives the reading motor 26 and the lens motor 27 by controlling the optical system motor drive circuit 14. This control adjusts the reading scope and resolution.

Line sensor 28 comprises a plurality of photoelectric converters arranged in a row and a transfer component for transferring charge accumulated in the photoelectric converters. The line sensor 28 is positioned so that the direction of arrangement (main scan direction) of the plurality of photoelectric converters intersects with the direction of movement (auxiliary scan direction) of the film original.

The line sensor 28 is either a monochrome image sensor or a color image sensor. The light source 31 used by a monochrome image sensor is a light source that switches between three colors R (red), G (green), and B (blue), or a white light source. The light source 31 used by a color image sensor is a white light source.

The line sensor drive circuit 16 controls the accumulating operation and accumulating time of line sensor 28. The line sensor drive circuit 16 also controls the main scan for sweeping out the accumulated charge (image signals, electrical signals) to the image signal processing circuit 15.

The image signal processing circuit 15 amplifies, signal processes and digitizes the signals from line sensor 28. The image signal processing circuit also supplies the digitized signals to CPU 11. The signal processing operations include correlated double sampling (CDS), shading correction, dark current correction, even-odd correction, and similar processing operations.

ROM 10 is a program memory and RAM 12 is a working memory. The ROM 10 and RAM 12 are connected by a bus to CPU 11. CPU 11 performs the control operations according to the program established in ROM 10.

According to one embodiment of the invention, CPU 11 receives the output of film information reading sensor 24 and film detection sensor 35 and determines whether the film original is a roll film or a 35 mm film, for example. The resolution and reading scope of line sensor 28 is then adjusted by controlling the optical system motor drive circuit 14 according to the result of this determination.

CPU 11 causes the film original to be read by controlling the opposing roller drive circuit 20, the line sensor drive circuit 16, the image signal processing circuit 15 and the light source drive circuit 18. CPU 11 then stores the read line data in RAM 12. CPU 11 outputs the line data stored in RAM 12 to host computer 50.

CPU 11 receives the output of the optical sensor 34 and performs position detection of the perforations. This can also be used to determine whether the read film original is a roll film or a 35 mm film.

The CPU 11 decides the type of original based on whether a perforation is present at a specified reading position of the line sensor 28. The reading range of the line sensor 28 matches the image storing area of the film 4. When no perforation is detected, the CPU 11 determines that film 4 is inserted into the image reading device 1. When a perforation is detected, the CPU 11 determines that film 7 is inserted into the image reading device 1.

Alternatively, a sensor may, for example, detect the position of the perforation of film 4 by outputting a high state when a light of high brightness is radiated thereon, and outputting a low state when a light of low brightness is radiated thereon. If the output signal of the sensor is continuously in a high state while the film is moving, the CPU 11 determines that there is no perforation. The CPU 11 then determines that film 7 is inserted into the image reading device 1. If the output signal of the sensor alternates between high and low while the film is moving, the CPU 11 determines that there is a perforation. In this case, the CPU 11 determines that film 4 is being detected. In this manner, the obtained result differs depending on the method of perforation detection.

IF circuit 13 is an SCSI (Small Computer System Interface). IF circuit 13 outputs line data (image data) stored in RAM 12 to the host computer 50. IF circuit 13 provides to CPU 11 various types of commands, such as frame specification and monitor screen setting information of the display device, that IF circuit 13 received from the host computer 50.

The host computer 50 displays screen data received from IF circuit 13 on the monitor screen. The host computer 50 also provides commands inputted from the keyboard and mouse to IF circuit 13.

The control program for the image scanning apparatus CPU 11 can be stored in ROM 10. It is also appropriate to use the central processing unit of the host computer 50 instead of the image scanning apparatus CPU 11 to control the image scanning apparatus. It is also appropriate to use the memory of the host computer 50 instead of the memory of the image scanning apparatus to perform the functions described above. Thus, it is possible to store the program of the flow chart of FIGS. 8–10 in the host computer 50, the hard disk drive, the host apparatus ROM, or other memory device 5. By reading the program stored in ROM to the memory, it is possible to perform the program in the center processing apparatus of the host computer 50.

In the illustrated embodiment, the image reading apparatus controller is implemented as a single special purpose integrated circuit (e.g., ASIC) having a main or central processor section for overall, system-level control, and separate sections dedicated to performing various different specific computations, functions and other processes under control of the central processor section. It will be appreciated by those skilled in the art that the controller can also be implemented using a plurality of separate dedicated or programmable integrated or other electronic circuits or devices (e.g., hardwired electronic or logic circuits such as discrete elements circuits, or programmable logic devices such as PLDs, PLAs, PALs or the like). The controller can also be implemented using a suitably programmed general purpose computer, e.g., microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the flowcharts shown in FIGS. 8–10, 12 and 13 can be used as the controller. As mentioned above, the various control functions also can be performed by the host apparatus. As shown, a distributed processing architecture is preferred for maximum data/signal processing capability and speed.

Conveyance of the film original is possible on the same conveyor path and reading is possible with the same optical system, regardless of whether a 35 mm strip film or a 35 mm slide-mounted film is used.

Figure 7A:
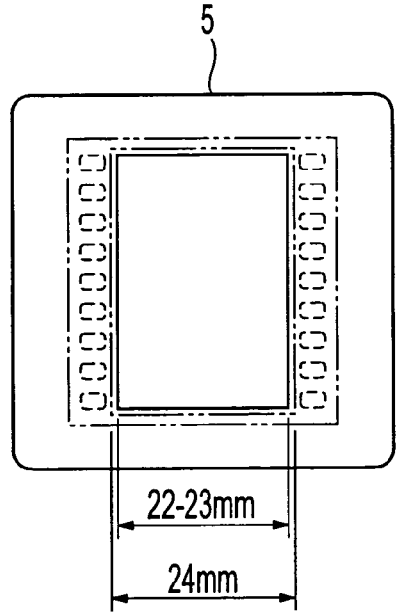
FIG. 7 is a plan view of the films used in FIGS. 4–6, and illustrates the width dimension of each film.
Figure 7B:
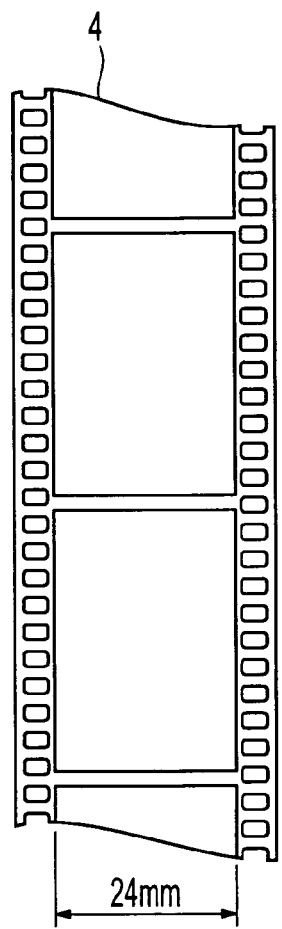
Figure 7C:
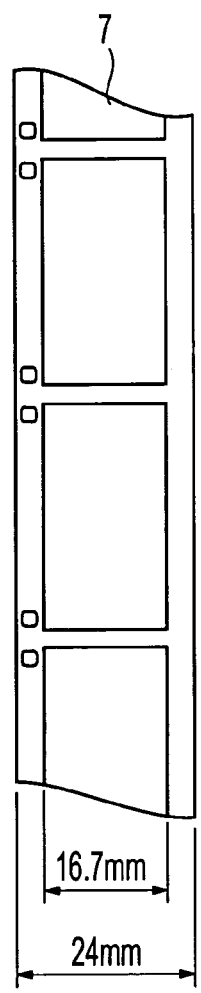

The width of each film original is shown in FIG. 7. Slide-mounted film 5 has an aperture width of approximately 22–23 mm. Strip film 4 has an image width of about 24 mm. Roll film 7 has an image width of about 16.7 mm. The overall width of roll film 7 is about 24 mm, approximately the same width as the image width of the 35 mm film.

Because the width measurements differ between new film and the 35 mm film, it is necessary to determine the type of film that is loaded in the apparatus. As previously explained, film information reading sensor 24 is provided in the loading chamber 22. Also, the film detection sensor 35 is provided in insertion opening 6. Furthermore, the user can specify the type of film original. Therefore, CPU 11 can determine the type of film directly from such information. In this case, there are few problems because CPU 11 can match the width of the image to the various film sizes.

Another method of determining the type of film original is explained in FIGS. 8–10, 12 and 13. This method does not utilize sensors 24 and 35 to make this determination. The program shown in the flow chart of FIGS. 8–10 can be stored in the memories mentioned above or in a memory medium 50a such as, for example, CD-ROM. This enables set-up in advance in the host computer 50.

Figure 8:
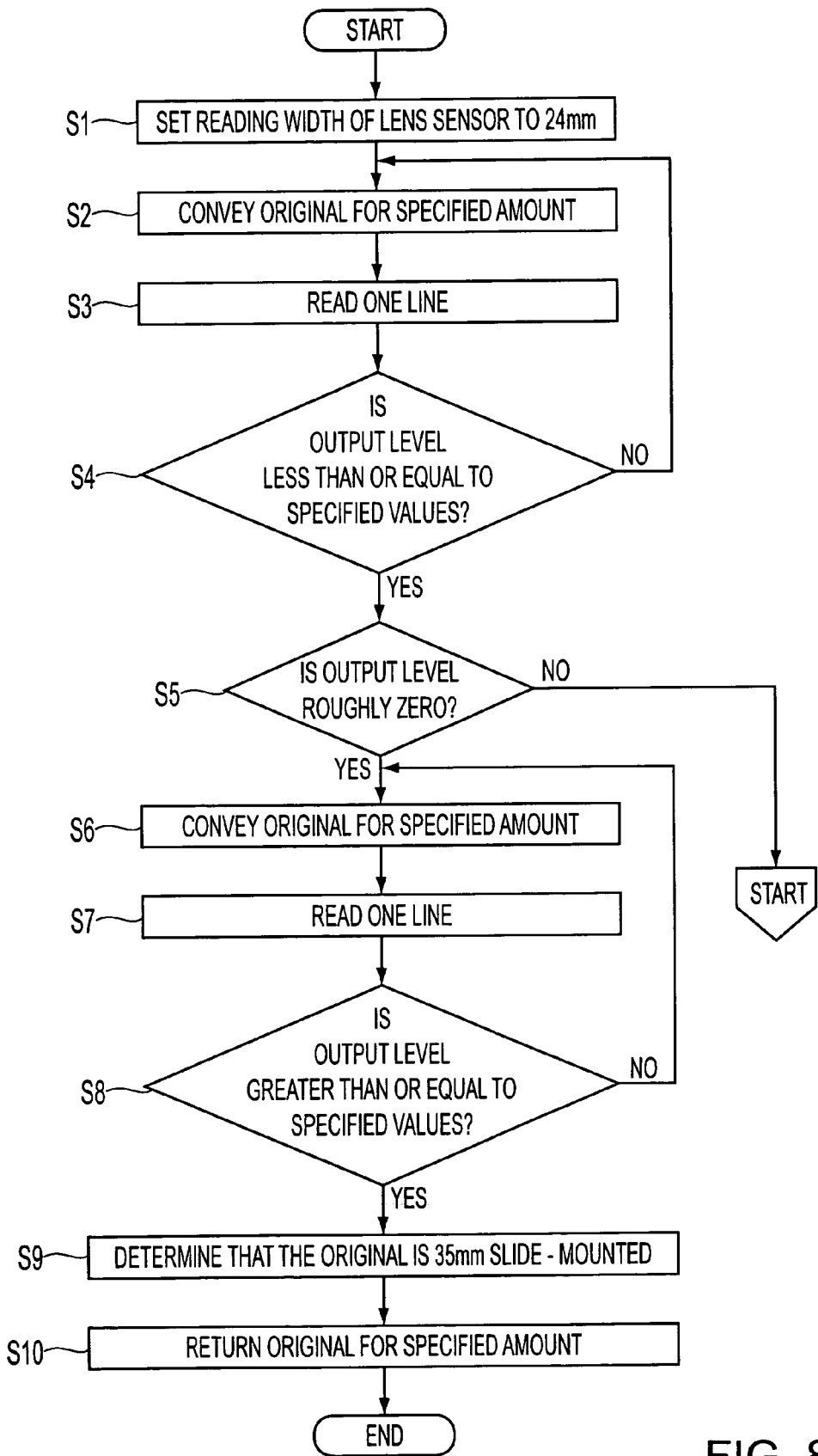
FIG. 8 is a flow chart of part of one film type discrimination process.
Figure 9:
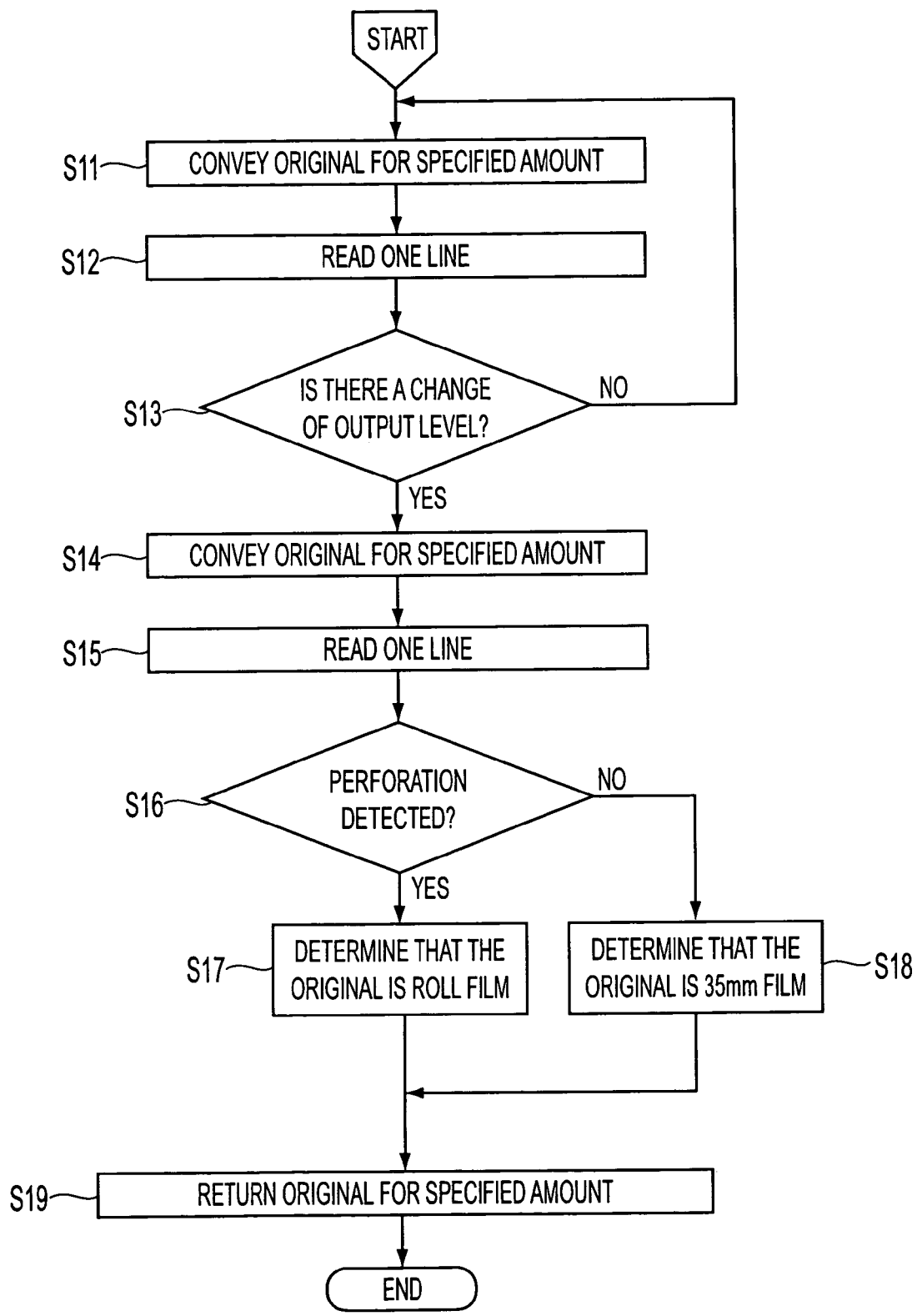
FIG. 9 is a flow chart of the remainder of the FIG. 8 film type discrimination process

Referring to FIG. 8, at step S1, CPU 11 sets the reading width of line sensor 28 to the image width of 35 mm film, which is the largest width. CPU 11 first performs detection of the image memory area, wherein an image is copied, by executing each process of steps S2–S5.

In step S2 CPU 11 drives the cartridge motor 23 and the opposing rollers 36, 37 and 38 according to the output of detection of the film information detection sensor 24 or the film detection sensor 35. It then conveys the film original for the specified amount of time or length. In step S3, CPU 11 performs reading of one line by operating the light source 31.

In step S4, CPU 11 determines from the result of step S3 whether or not the output level of line sensor 28 has become less than or equal to a specified value. When the determination is negative (NO), it performs iterative processing of steps S4→S2→S3→S4 until the determination becomes affirmative (YES). In the iterative processing of steps S4→S2→S3→S4, the arrival of the leading end of the loaded film original to the reading position is detected.

Until the leading end of the film original comes up to the reading position between the opposing rollers 38 and 39, the projected light of the light source 31 is input directly into the line sensor 28. Therefore, the output level of line sensor 28 is great.

When the leading end of the film original arrives at the reading position between the opposing rollers 38 and 39, the projected light of the light source 31 is blocked by the film original. It can also be transmitted through the film original. Therefore, the output level of the line sensor 28 becomes a level corresponding to the type of film original.

In step S5, when the determination of step S4 becomes affirmative (YES), CPU 11 determines whether or not the output level of line sensor 28 is about zero. When the output level of line sensor 28 becomes about zero, it means that the frame of a slide-mounted film 5 is present.

When the determination of step S5 is affirmative (YES), CPU 11 conveys the film original for the specified amount in step S6. In step S7, CPU 11 performs reading of one line. In step S8, CPU 11 determines whether or not the result of reading has become greater than or equal to a specified value.

CPU 11 repeats the processing of steps S8→S6→S7→S8 until the determination of step S8 becomes affirmative (YES). If the determination is affirmative (YES), the frame portion of the slide-mounted film 5 has passed the reading position. Also, the film portion (the image memory area wherein an image is stored) has arrived at the reading position.

In step S9, CPU 11 determines that the film original is a slide-mounted film 5. In step S10 CPU 11 performs an operation of returning the film original for a specified amount. That is, the CPU 11 sets the boundary between the frame portion and the film portion of the film original to the read position. At this point, the CPU 11 ends the present procedure.

When the determination of step S5 is negative (NO) (e.g., the film original is not slide-mounted film), CPU 11 advances to step S11 and conveys the film original for a specified amount. In step S12, CPU 11 performs reading of one line. In step S13, CPU 11 determines whether or not there is a change in the output level of line sensor 28.

CPU 11 repeats the processing of steps S13→S11→S12→S13 until the determination becomes affirmative (YES). If the determination of step S13 is negative (NO), the frame body of strip film 4 or roll film 7 (i.e., the portion of the film that surrounds image areas and that has a constant density) has reached the reading position.

The fact that the determination of S13 becomes affirmative (YES) indicates that the frame body of strip film 4 or roll film 7 has passed the reading position and that an image memory area has reached the reading position. Thus, an image that is to be copied has arrived at the reading position.

When the determination of step S13 becomes affirmative (YES), CPU 11 conveys the film original for a specified amount in step S14. In step S15, CPU 11 performs reading of one line. In step S16, CPU 11 determines whether or not a perforation was detected.

The reading width of line sensor 28 is initially set to the reading width appropriate for 35 mm film. As shown in FIG. 7, the reading width of 35 mm film exceeds the image width of roll film 7 and reaches the total width of the film. Consequently, when the film original is roll film 7, the output level of line sensor 28 becomes suddenly greater when a perforation reaches the reading position. In this manner, CPU 11 determines whether 35 mm film or roll film is present.

When the determination of step S16 is affirmative (YES), CPU 11 (in step S17) determines that the film original is roll film 7 and advances to step S19. When the determination of step S16 is negative (NO), CPU 11 (in step S18) determines that the film original is strip film 4 and advances to step S19.

Figure 10:
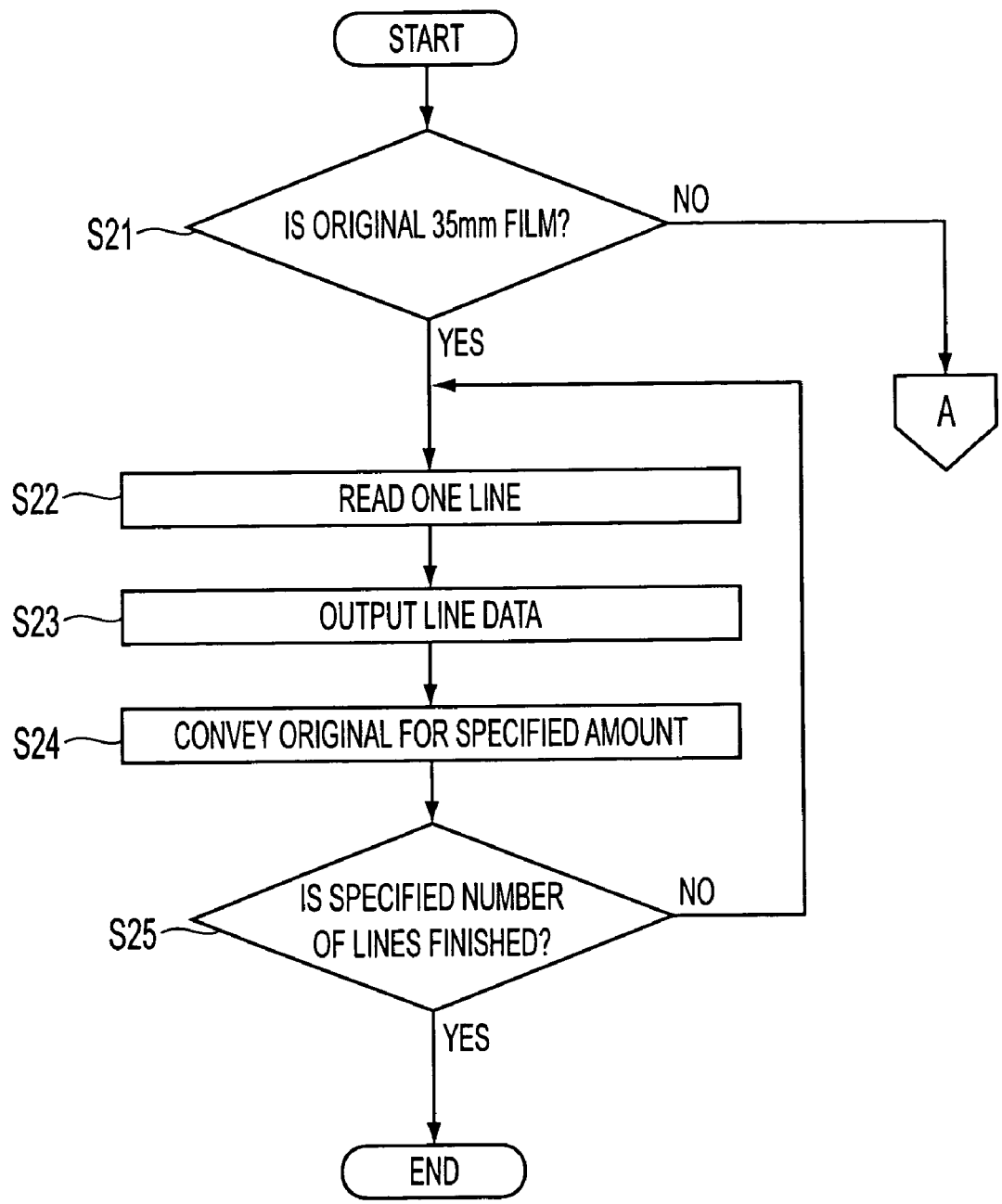
FIG. 10 is a flow chart of one film type discrimination process for 35 mm film.
Figure 12:
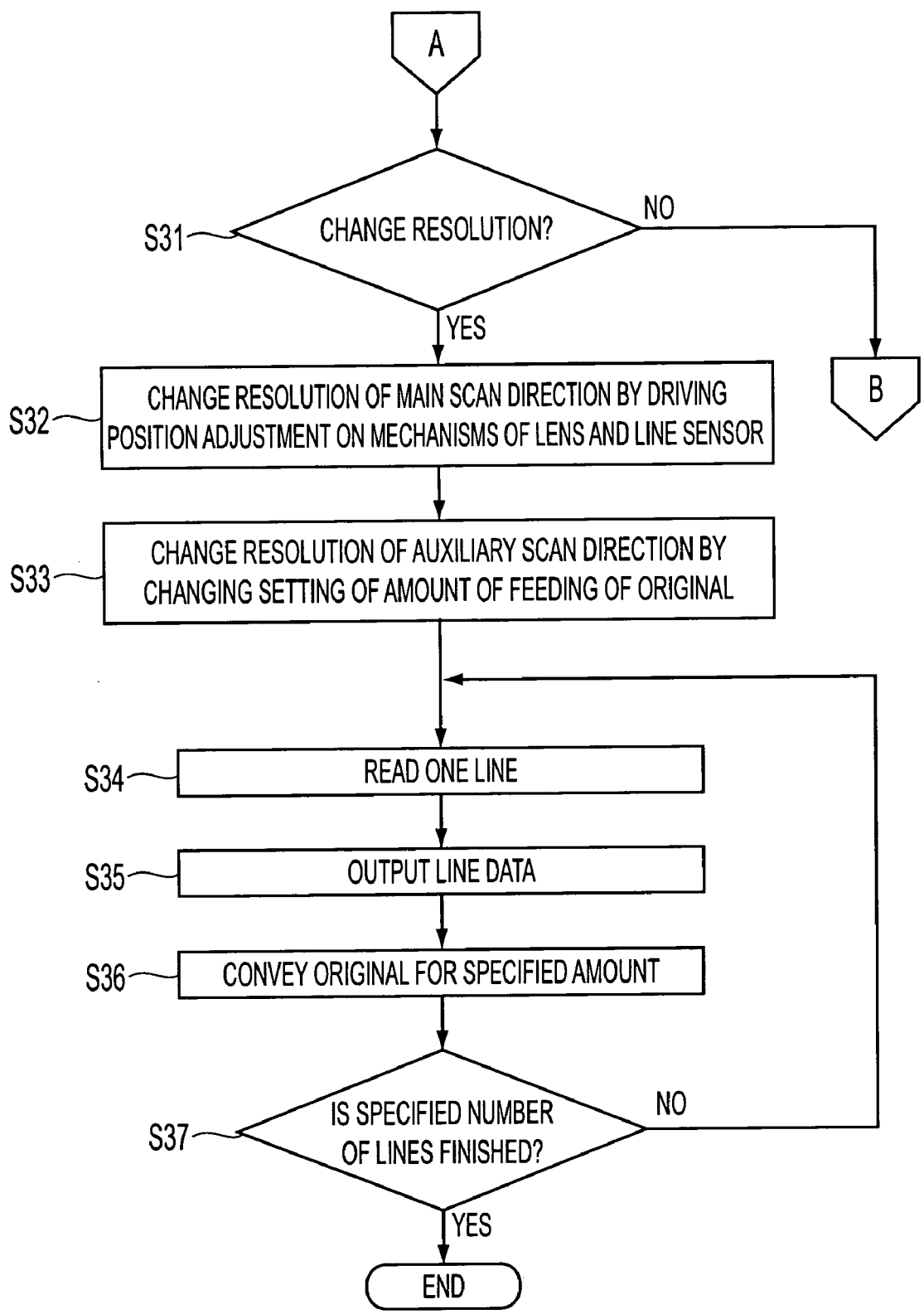
FIG. 12 is a flow chart of part of one film type discrimination process for roll film.
Figure 13:
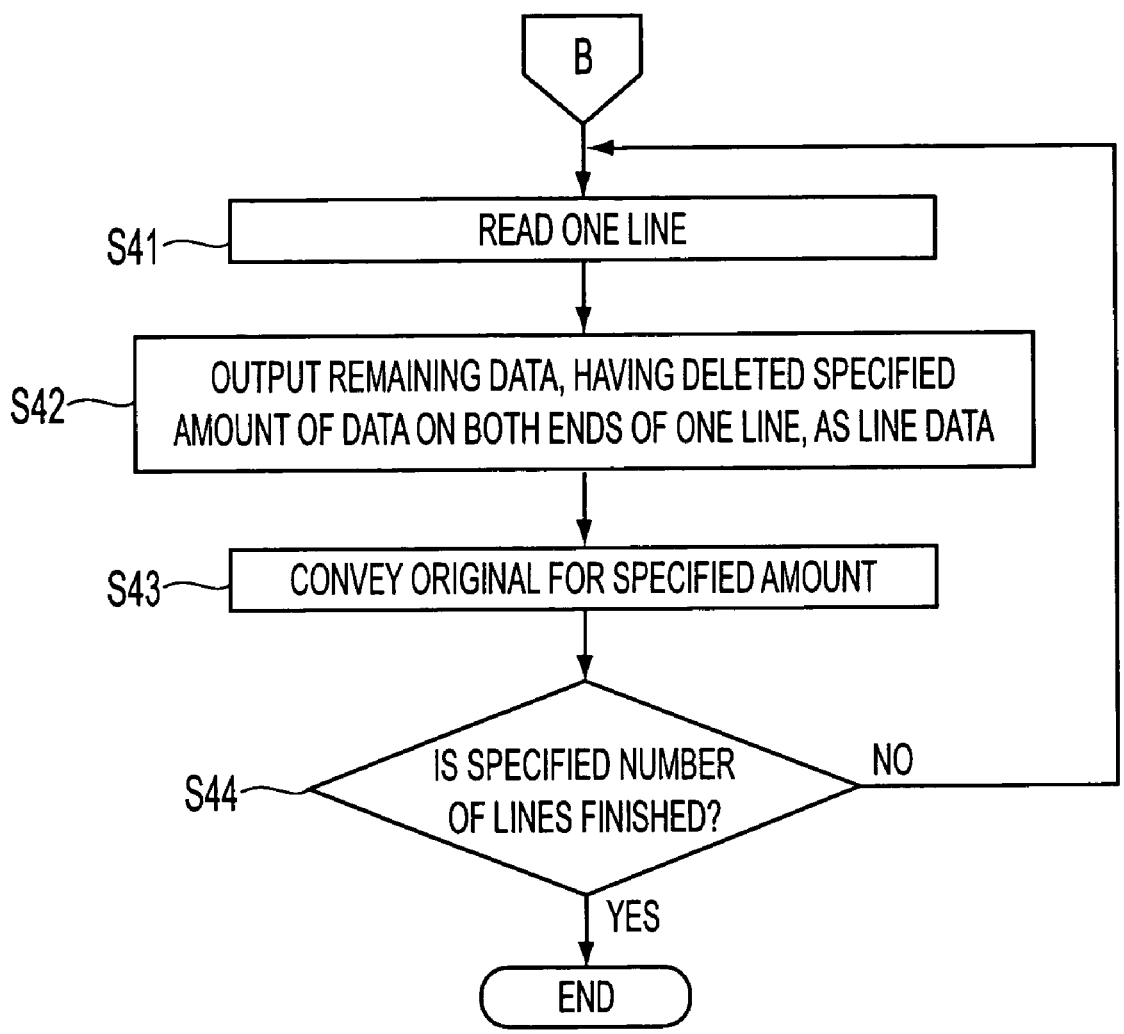
FIG. 13 is a flow chart of the remainder of the FIG. 12 film type discrimination process.

When the type of the loaded film original is determined, CPU 11 executes the reading operation on the film by the procedures shown in FIGS. 10, 12 and 13. Initially, the reading scope of line sensor 28 is set for use with 35 mm film.

Referring to FIG. 10, in step S21, CPU 11 determines whether or not the loaded film original is 35 mm film. This determination is performed by the previously described method.

When the film is 35 mm film, CPU 11 makes an affirmative (YES) determination in step S21. At this time, CPU 11 performs reading of 35 mm film by executing each process of steps S22–S25. Meanwhile, when the film is not 35 mm film, CPU 11 makes a negative (NO) determination in step S21, and it performs reading of the roll film by executing each process of steps S31–S44.

In reading 35 mm film (strip film 4 and slide-mounted film 5), the reading scope of the line sensor 28 is set for use with 35 mm film. Therefore, CPU 11 executes reading without performing an operation to modify the reading scope.

Figure 11A:
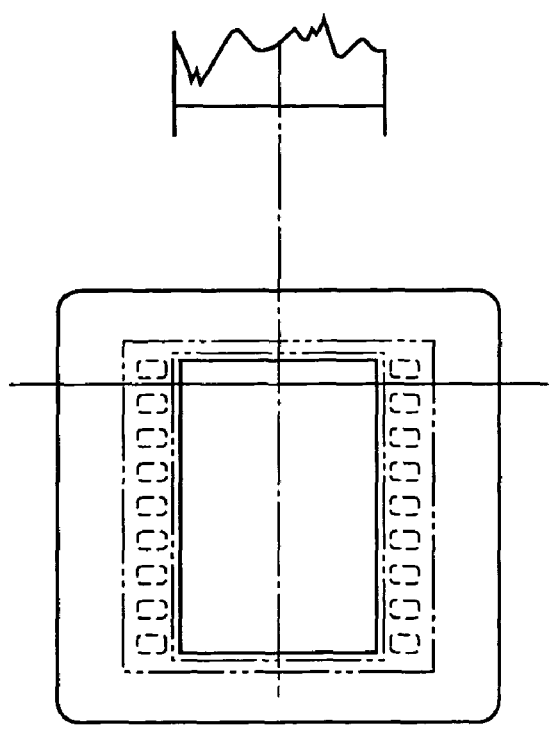
FIGS. 11(a) and 11(b) are explanatory drawings for reading 35 mm film.
Figure 11B:
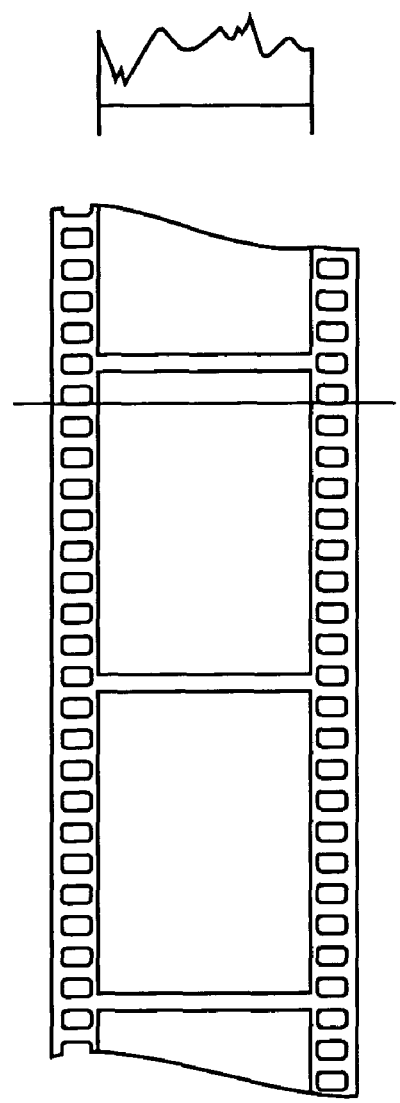

As previously described, when the type of film original is determined, the film is positioned at the reading start position. In step S22, CPU 11 reads one line (the read line shown in FIGS. 11(a) and 11(b)). In step S23, CPU 11 reads from RAM 12 the line data of the one line read and outputs it to the host computer 50.

In step S24, CPU 11 conveys the film original for a specified amount in the auxiliary scan direction. In step S25 CPU 11 determines whether or not reading of a specified number of lines has ended. CPU 11 repeats the processing of steps S25→S22→S23→S24→S25 until the determination of step S25 becomes affirmative (YES). When the determination of step S25 becomes affirmative (YES), CPU 11 ends the present procedure.

In the reading of roll film 7, the reading scope of the line sensor 28 is initially set for use with 35 mm film. Therefore, useless portions are included at both ends of the line data read by CPU 11. Consequently, CPU 11 performs the operation of modifying the reading scope. The reading scope can be modified by adjusting the optical system of the image reading device as detailed in the FIG. 12 flow chart or by performing an image processing operation in which the useless data is discarded, as detailed in the FIG. 13 flow chart.

In step S31 CPU 11 determines whether or not to modify the resolution of reading by adjusting the optical system. This is determined by whether or not there was such an instruction from the host computer 50.

When the determination of step S31 is affirmative (YES), CPU 11 executes the processing of steps S32–S37 (FIG. 12). That is, CPU 11 modifies the reading scope by adjusting the optics of the image reading device. This also could be considered to be a process in which the reading scope is modified prior to reading.

When the determination of step S31 is negative (NO), CPU 11 executes the processing of steps S41–S44 (FIG. 13). That is, CPU 11 modifies the reading scope by discarding useless data. This also could be considered to be a process in which the reading scope is modified after reading. This process does not require the reading device to include a movable optical system.

When the determination of step S31 is affirmative (YES), CPU 11 advances to step S32. In step S32 CPU 11 modifies the resolution of the main scan direction to the reading width of approximately 16.7 mm (specific to roll film) by performing position adjustment of the line sensor 28 and the lens 29. This is done by the optical system drive motor 14.

In step S33, CPU 11 modifies the amount of feeding of the original by opposing rollers 38 and 39 at a proportion of 16.7/24 by controlling the opposing roller drive circuit 20. This modifies the resolution of the auxiliary scan direction so as to maintain the vertical-horizontal (aspect) ratio of the image at a constant value.

In modification of the amount of feeding of the original, a switching mechanism may also be furnished in addition to adjustment of the amount of rotation of opposing rollers 38 and 39. For example, the switching mechanism may have a 16.7:24 gear ratio.

Figure 14A:
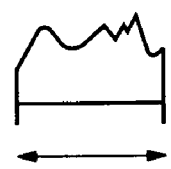

When the above reading scope modification process ends, CPU 11 executes the reading processes of steps S34–S37. In step S34, CPU 11 reads one line at 16.7 mm (FIGS. 14(a) and 14(d)) specific to roll film. In step S35, CPU 11 reads from RAM 12 the line data of the one line read and outputs it to the host computer 50.

In step S36, CPU 11 conveys the film original for a specified amount in the auxiliary scan direction. In step S36, CPU 11 determines whether or not the reading of a specified number of lines has ended. CPU 11 repeats the processing of steps S37→S34→S35→S36→S37 until the determination of step S37 becomes affirmative (YES). When the determination of step S37 becomes affirmative (YES), CPU 11 ends the present procedure.

When the determination of step S31 is negative (NO), CPU 11 advances to step S41 (FIG. 13). In step S41 CPU 11 performs reading of one line leaving the reading scope of line sensor 28 in the state specific to 35 mm film (FIG. 14(c)). As previously described, in this case there are useless portions included outside the image on both ends of the reading scope (FIG. 14(c)).

Figure 14B:
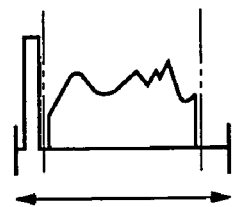
Figure 14D:
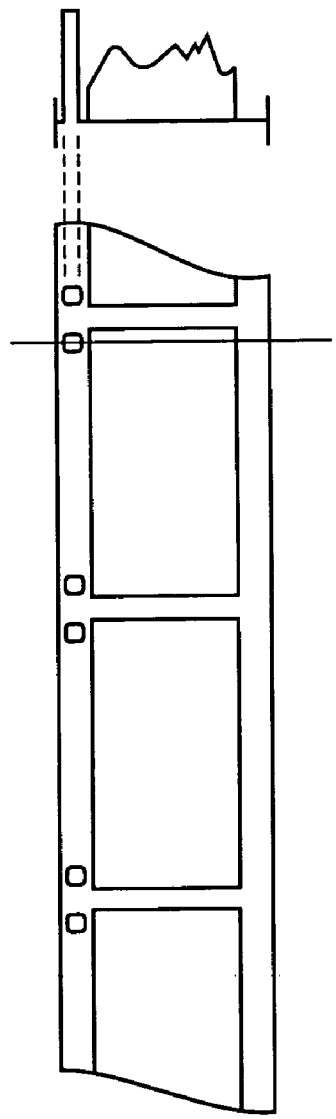

Rather than outputting this line data which contains some useless data, to the host computer 50, in step S42 CPU 11 outputs only the part of the data (FIG. 14(b)) that does not have the useless data at both ends to the host computer 50 as the line data. This can be accomplished using known data processing techniques.

In step S43, CPU 11 conveys the film original for a specified amount in the auxiliary scan direction. In step S44, CPU 11 determines whether or not reading of the specified number of lines has ended. CPU 11 repeats the processing of steps S44→S41→S42→S43→S44 until the determination of step S44 becomes affirmative (YES)

In the above description, a reading is performed by using the line sensor 28 having a plurality of photoelectric converters arranged in a row. However, an area sensor having a plurality of photoelectric converters arranged in a matrix of rows and columns can also be utilized.

Thus, the type of film original can be determined and the reading scope of the image reading apparatus can be modified accordingly. Therefore, no matter whether a first film original or a second film original (having different film sizes) is loaded, the image scope of that loaded film original can be read and output.

Also, the type of film original can be determined and the reading resolution of the image reading apparatus can be modified accordingly. Therefore, no matter whether a first film original or a second film original (having different film sizes) is loaded, the light-receiving area of the image reading apparatus can be employed effectively and, thus, a high-quality image can be obtained.

Additionally, when the image reading apparatus includes a line sensor, the amount of feeding in the auxiliary scan direction can be controlled according to the modified resolution. Therefore, the vertical-horizontal (aspect) ratio of the pixels can be maintained constant and the resolution can be modified without trouble (even with a line sensor).

The invention also is applicable to image reading devices that read images from originals other than film. Such originals can be transparent, translucent or opaque. The light can pass through or be reflected from the original as is appropriate.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing form the spirit and scope of the invention as defined in the following claims.

What is claimed is:

1. An image reading apparatus, comprising:
   image reading means for reading an image on an original and outputting an image signal;
   type determining means for determining whether the original is one of a first original having a first size and a second original having a second size; and
   reading scope modifying means for modifying a reading scope of the image reading means according to the determination made by the type determining means.

2. An image reading apparatus of claim 1, wherein the determining means performs type determination of the original by detecting whether a perforation is present in a predetermined position.

3. An image reading apparatus of claim 1, wherein the type determining means performs type determination of the original according to a specification of the type of original.

4. An image reading apparatus of claim 1, further comprising loading detection means for detecting whether the original is loaded into the apparatus, wherein the determining means performs type determination of the original based on the detection performed by the loading detection means.

5. An image reading apparatus of claim 1, further comprising resolution modifying means for modifying a reading resolution of the image reading means according to the result of determination of the type determining means.

6. An image reading apparatus, comprising:
   image reading means for reading an image on an original and outputting an image signal;
   type determining means for determining whether the original is one of a first original having a first size and a second original having a second size; and
   resolution modifying means for modifying a reading resolution of the image reading means according to the determination made by the type determining means.

7. An image reading apparatus of claim 6, wherein the image reading means comprises:
   a line sensor having a plurality of photoelectric converters arranged in a row, the line sensor further having a main scanning direction in a direction of the row;
   moving means for moving at least one of the original and sensor in an auxiliary scan direction that crosses the main scanning direction, wherein an image on the original is read by successively performing a main scan and an auxiliary scan; and
   control means for controlling an amount of movement in the auxiliary scan direction by the moving means according to the resolution modified by the resolution modifying means.

8. An image reading apparatus of claim 6, wherein the type determining means performs type determination of the original by detecting whether a perforation is present in a predetermined position.

9. An image reading apparatus of claim 6, wherein the type determining means performs type determination of the original according to a specification of the type of original.

10. An image reading apparatus of claim 6, further comprising loading detection means for detecting whether the original is loaded into the apparatus, wherein the type determining means performs type determination of the original based on the detection performed by the loading detection means.

11. An image reading apparatus, comprising:
    a photoelectric converter that outputs an image signal of an original;
    an original type detector that determines whether the original loaded in the apparatus is one of a first original having a first size and a second original having a second size; and
    a controller coupled to the photoelectric converter and to the original type detector, to determine a reading scope of the photoelectric converter based on the determination made by the original type detector.

12. An image reading apparatus of claim 11, wherein the original type detector detects whether a perforation is present in a predetermined position.

13. An image reading apparatus of claim 11, wherein the original type detector includes a user input device by which a user specifies the type of original.

14. An image reading apparatus of claim 11, wherein the original type detector includes a loading detection sensor provided in paths of the different types of originals.

15. An image reading apparatus of claim 11, wherein the controller also determines a reading resolution to be used with the photoelectric converter based on the determination made by the original type detector.

16. An image reading apparatus of claim 11, further comprising a movable optical system arranged relative to the photoelectric converter so as to focus an image of the original on the photoelectric converter; and wherein
    the controller determines the reading scope by determining a position of the movable optical system.

17. An image reading apparatus of claim 11, wherein the controller determines the reading scope by determining an amount of data output by the photoelectric converter that is to be discarded.

18. An image reading apparatus, comprising:
a photoelectric converter that outputs an image signal of an original;
an original type detector that determines whether the original loaded in the apparatus is one of a first original having a first size and a second original having a second size; and
a controller coupled to the photoelectric converter and to the original type detector, to determine a reading resolution to be used with the photoelectric converter based on the determination made by the original type detector.

19. An image reading apparatus of claim 18, wherein the photoelectric converter comprises:
a line sensor having a plurality of photoelectric converter elements arranged in
a row, the line sensor further having a main scanning direction in a direction of the row;
a drive mechanism that moves at least one of the original and the line sensor in
an auxiliary scan direction that crosses the main scanning direction, whereby an image on the original is read by successively performing a main scan using the plurality of photoelectric converter elements and an auxiliary scan using the original drive; and wherein
the controller controls the amount of original feeding in the auxiliary scan direction by the original drive based on the determined reading resolution.

20. An image reading apparatus of claim 18, wherein the original type detector detects whether a perforation is present in a predetermined position.

21. An image reading apparatus of claim 18, wherein the original type detector includes a user input device by which a user specifies the type of original.

22. An image reading apparatus of claim 18, wherein the original type detector includes a loading detection sensor provided in the paths of the different types of originals.

23. A method of reading originals having different sizes, comprising:
reading an image on the original with a photoelectric converter that outputs an image signal;
determining whether the original is one of a first original having a first size and a second original having a second size; and
modifying a reading scope of the photoelectric converter according to the result of the determining step.

24. A method of claim 23, wherein the determining step includes detecting whether a perforation is present in a predetermined position.

25. A method of claim 23, further comprising modifying a reading resolution of the reading step according to the result of the determining step.

26. A storage medium that stores a control process for an image reading apparatus that has a photoelectric converter that outputs an image signal of an original that is scanned by the photoelectric converter, the control process comprising:
an original classification process for classifying an original loaded into the image reading apparatus as one of a first original having a first size and a second original having a second size different than the first size; and
a scanning variation process for changing a scanning range of the photoelectric converter based on a result of the original classification process.

27. The storage medium of claim 26, wherein the original classification process classifies the original based on whether a perforation is detected in a predetermined position.

28. The storage medium of claim 26, wherein the image reading apparatus also includes a loading sensor that detects whether an original is present in the apparatus, and
wherein the original classification process classifies the original based on the detection of said loading sensor.

29. The storage medium of claim 26, wherein the original classification process classifies the original based on a user input designation of the type of original loaded into the apparatus.

30. A storage medium that stores a control process for an image reading apparatus that has a photoelectric converter that outputs an image signal of an original that is scanned by the photoelectric converter, the control process comprising:
an original classification process for classifying an original loaded into the image reading apparatus as one of a first original having a first size and a second original having a second size different than the first size; and
a resolution changing process that changes a resolution of the scanning process performed by the photoelectric converter based on a result of the original classification process.

31. The storage medium of claim 30, wherein the original classification process classifies the original based on whether a perforation is detected in a predetermined position.

32. The storage medium of claim 30, wherein the image reading apparatus also includes a loading sensor that detects whether an original is present in the apparatus; and
wherein the original classification process classifies the original based on the detection of said loading sensor.

33. The storage medium of claim 30, wherein the original classification process classifies the original based on a user input designation of the type of original loaded into the apparatus.

34. The storage medium of claim 30, wherein the photoelectric converter is a line sensor having a plurality of photoelectric converter elements arranged in a row in a main scanning direction, wherein the line sensor scans in the main scanning direction; and the image reading apparatus also includes a conveyor system that moves at least one of the original and the line sensors relative to each other in an auxiliary scan direction that crosses the main scanning direction; wherein
the resolution changing process changes the resolution by changing the amount of movement in the auxiliary scan direction.

* * * * *